United States Patent [19]

Michaud et al.

[11] 4,234,332
[45] Nov. 18, 1980

[54] AQUEOUS FERTILIZER SOLUTIONS CONTAINING DICYANDIAMIDE

[75] Inventors: Horst Michaud, Trostberg; Georg Rieder, Grobenzell; Josef Seeholzer, Trostberg, all of Fed. Rep. of Germany

[73] Assignee: SKW Trostberg Aktiengesellschaft, Trostberg, Fed. Rep. of Germany

[21] Appl. No.: 5,791

[22] Filed: Jan. 23, 1979

Related U.S. Application Data

[63] Continuation-in-part of Ser. No. 877,873, Feb. 15, 1978, abandoned, and Ser. No. 870,322, Jan. 18, 1978, abandoned.

[30] Foreign Application Priority Data

Jan. 20, 1977 [DE] Fed. Rep. of Germany ....... 2702284
Feb. 23, 1977 [DE] Fed. Rep. of Germany ....... 2707639

[51] Int. Cl.$^3$ ........................... C05C 7/00; C05C 9/00
[52] U.S. Cl. ........................................... 71/30; 71/27; 71/64 C; 564/106
[58] Field of Search ............... 71/27, 28, 29, 30, 64 C, 71/DIG. 2; 260/551 C

[56] References Cited

U.S. PATENT DOCUMENTS

| 3,256,083 | 6/1966 | Goring ............................. 71/27 X |
| 3,877,920 | 4/1975 | Carlberg ........................... 71/28 X |

FOREIGN PATENT DOCUMENTS

| 2702284 | 8/1978 | Fed. Rep. of Germany .............. 71/27 |
| 2707639 | 8/1978 | Fed. Rep. of Germany .............. 71/27 |
| 49-2361085 | 6/1974 | Japan ................................... 71/27 |
| 21590 | of 1909 | United Kingdom ...................... 71/49 |

OTHER PUBLICATIONS

Olson et al., Fertilizer Technology & Use (2nd Ed.); 1971; Soil Science Society of America, Inc., Madison, Wisconsin, pp. 467, 483.
Liquid Fertilizer Manual; NFSA, 910 Lehmann Bldg., Peoria, Ill.; 1967; pp. 17-1, 1-1, 12-9, 21-i.

Primary Examiner—Kenneth M. Schor
Attorney, Agent, or Firm—Curtis, Morris & Safford

[57] ABSTRACT

Aqueous solutions of commonly used fertilizers which also contain dicyandiamide, in an amount to provide at least 10% by weight of dicyandiamide nitrogen, are effective nitrification inhibitors and have an improved capacity to dissolve micronutrients to form solutions of improved micronutrient stability.

14 Claims, No Drawings

AQUEOUS FERTILIZER SOLUTIONS CONTAINING DICYANDIAMIDE

This application is a continuation-in-part of application Ser. No. 870,322 filed Jan. 18, 1978 now abandoned and Ser. No. 877,873 filed Feb. 15, 1978 now abandoned.

This invention relates to fertilizer solutions based on nitrogen compounds, and which may also contain phosphates and/or potassium salts, as well as micronutrients.

The use of fertilizers in liquid form is known. The increasing interest in this form of fertilizer is due in particular to the fact that liquid fertilizers can be offered at a low price, they are easy to handle, they make possible exact dosing, different fertilizers can be readily mixed with each other, and plant protection agents can be applied together with the fertilizer solution in a single operation.

The application of large amounts of nitrogen per unit area in one operation, while it saves operating expenses, has the disadvantage that losses of nitrogen can occur by washing out and de-nitrification and, since the nutrient substances are not applied continuously but at a single time, the plants are stimulated by the sudden addition of nutrient substance to sustain a sudden and unhealthy growth.

With nitrogen fertilizers in solid form these disadvantages are avoided by providing the fertilizer granules with waxes, resins, or other coatings in order to obtain a regulated continuous liberation of the fertilizer nutrients. It is also known to add nitrification inhibitors, i.e., compounds which retard the rapid conversion of ammonium nitrogen into nitrate nitrogen by the bacteria of the soil.

When high doses of nitrogen per unit area in the form of fertilizer solutions are applied in a single operation, the aforementioned disadvantages can be reduced by admixing nitrification-inhibiting substances in the solution. The known nitrification inhibitor, 2-chloro-6-trichloromethylpyridine, due to its volatility, requires immediate incorporation of the mixtures into the soil, i.e., an additional amount of work.

Dicyandiamide also has a nitrification-inhibiting action. It is a solid, crystalline, physiologically unobjectionable substance of high melting point and is produced industrially in large quantities from calcium cyanamide.

In French Pat. No. 1,232,366 it is proposed to add dicyandiamide as nitrification inhibitor in amounts of up to 30% to solid ammonium or urea fertilizers. The addition of dicyandiamide to nitrogen-containing fertilizers is recommended also in German patent application DOS No. 20 51 935.

Upon further study of the use of dicyandiamide as a nitrification inhibitor, it has been found that sufficient retardation of the nitrification occurs when at least 10 weight % dicyandiamide nitrogen is present, based on the total nitrogen of a fertilizer. To the best of our knowledge, it has not been possible up to now to consider the use of dicyandiamide in fertilizer solutions since this compound dissolves in water only to the extent of 1.27% by weight at 0° C. and 3.33% by weight at 20° C. As known from experience, the solubility of dicyandiamide in most salt solutions is even less than this, so that a combination of dicyandiamide with aqueous fertilizer solutions has not even been attempted. It has therefore been a problem to find a fertilizer solution into which dicyandiamide can be introduced in sufficient amount for it to develop its activity as a nitrification inhibitor.

Another problem that has been encountered in the manufacture of liquid fertilizers relates to the inclusion of micronutrients therein. The increasing use of liquid fertilizers makes necessary for special uses and particularly for intensive methods of cultivation, not only a sufficient supply of the principal plant nutrients, namely, nitrogen, phosphorus and potash, but also a certain amount of micronutrients, i.e., trace elements usually in the form of inorganic salts, particularly metal salts. The production of such nutrient solutions however gives rise to certain difficulties since most metal salts are soluble only with difficulty in the ordinary nutrient solutions. Furthermore chemical reactions among the individual compounds cannot always be avoided and may lead to the formation of undesired precipitates. Accordingly, these prior art solutions must be applied immediately after the addition of the micronutrients thereto.

It is known that the solubility of many trace elements can be increased by the addition of chelating agents. For this purpose amino acids are primarily used. It has been found that by using amino acids the effectiveness of the trace elements is substantially increased and that only 1/5 to 1/10 of the amount otherwise necessary is required. However, such chelating agents are relatively expensive.

It is therefore an object of the present invention to provide an aqueous fertilizer solution having improved nitrification-inhibiting properties. It is another object of the invention to provide an aqueous fertilizer solution which has an increased solubility for micronutrients and which increases the stability of micronutrients dissolved therein. Other objects of the invention will be in part obvious and in part pointed out hereafter.

In general the present invention is based on the discovery that both of these objectives can be attained by utilizing certain aqueous fertilizer solutions having dicyandiamide dissolved therein. Considering first the problem of attaining improved nitrification inhibition, the solution of this problem disclosed herein is based on our discovery that aqueous solutions of certain nitrogen-containing compounds commonly used in commercial fertilizers are capable of dissolving substantially greater quantities of dicyandiamide that can be dissolved in pure water. More particularly, we were surprised to find that aqueous solutions of a nitrogen-containing compound selected from urea, ammonium nitrate, ammonia and mixtures thereof are capable of dissolving quantities of dicyandiamide well above the amounts required to achieve a nitrification-inhibiting effect, i.e., above the concentrations at which the dicyandiamide nitrogen is 10% or more of the total nitrogen in the solution.

It may be noted that not all nitrogen-containing compounds have the property of increasing the solubility of dicyandiamide in aqueous solutions of such compounds. Thus as indicated in the data given in the following Examples, ammonium sulfate alone or in combination with ammonium phosphate fails to produce the desired increase in the solubility of dicyandiamide. On the other hand, the addition of ammonium sulfate to an aqueous solution containing ammonium nitrate, urea or ammonia does not appear to affect detrimentally the solubilizing properties of such a solution.

It has further been found that other common fertilizer compounds such as phosphates and soluble potassium salts can be added to solutions of such nitrogen compounds without destroying their ability to dissolve relatively large amounts of dicyandiamide. Hence in accordance with the present invention it is possible to formulate multi-nutrient fertilizer solutions containing, in addition to dicyandiamide solubilizing compounds referred to above, other fertilizer compounds such as commercial diammonium phosphate and potassium chloride, as well as ammonium sulfate if desired.

Still further it has been found that aqueous fertilizer compositions of the type described above are capable of dissolving significantly increased amounts of micronutrients. It may be noted that where the aqueous fertilizer solution containing dicyandiamide is prepared primarily to achieve an increase in micronutrient content, the amount of dissolved dicyandiamide is less critical than where inhibition of nitrification is desired. Thus whereas a solution containing at least about 10% of dicyandiamide nitrogen is required to achieve acceptable inhibition of nitrification, increases in micronutrient solubility can be achieved with relatively small amounts of dissolved dicyandiamide.

Also a wider variety of nitrogen-containing fertilizers can be used in solutions wherein the dicyandiamide is used to enhance solubility of micronutrients. For example, whereas as indicated below aqueous fertilizer solutions containing ammonium sulfate as the sole fertilizer component are incapable of dissolving at 20° C. an amount of dicyandiamide corresponding to 10% by weight of dicyandiamide nitrogen, ammonium sulfate-containing solutions can be used to achieve liquid fertilizers of relatively high micronutrient content since relatively small amounts of dicyandiamide are capable of increasing the micronutrient solubility of the solution. More generally the nitrogen-containing compound used in such solutions may be any of the commonly used fertilizers such as urea, ammonium nitrate, ammonium sulfate or ammonia in liquified form or as a concentrated aqueous solution. Such solutions may also contain mixtures of said nitrogen compounds, and phosphates and/or potassium salts may also be added without the solubility of the dicyandiamide, and thus of the micronutrients, being thereby reduced.

The preferred quantity of dicyandiamide for either nitrification inhibition or micronutrient solubilization and stabilization is that amount required to provide at least about 10% dicyandiamide nitrogen based on the total amount of nitrogen in the solution. Using such solutions a micronutrient concentration of say 0.1% to 1.5% can be achieved. The upper limit on the amount of the dicyandiamide does not appear to be critical and may be the maximum amount that can be dissolved in the fertilizer solution, say about 35%. Dicyandiamide increases the solubility of many trace nutrients in fertilizer solutions considerably and stabilizes such solutions for a long time. Furthermore, it makes it possible to prepare fertilizer solutions containing micronutrients at the fertilizer manufacturing plant in the form of a concentrate, e.g., in unit packages.

As micronutrients there are used in particular the following elements, in the form of their water-soluble salts: boron, iron, cobalt, copper, manganese, molybdenum, nickel, and zinc. The addition of other trace elements is possible.

It was surprising to us to find that the stability of the nutrient solutions containing the metal salts is retained for a long time in the presence of dicyandiamide. The solutions remain clear and do not form precipitates, even at low temperatures.

The Examples given below show that in the fertilizer solutions containing dicyandiamide, as much as several times the amount of trace elements can be introduced as can be dissolved in solutions containing no dicyandiamide. Furthermore, dicyandiamide prevents the formation of hydroxide and oxide precipitates in the case of elements which are easily hydrolyzable and oxidizable. This is particularly noteworthy in the case of ferrous and manganous salts. Without dicyandiamide, deposits of insoluble ferric hydroxide and manganese dioxide precipitate from said solutions after only a short time. In the presence of dicyandiamide these solutions remain clear, even when stored for long periods.

It has furthermore been found that as a result of the presence of dicyandiamide the strong corrosive effect of the ordinary fertilizer salt solutions, particularly with respect to iron, is considerably reduced.

Any dicyandiamide of technically pure grade is suitable for use in the present compositions. The more finely granular the dicyandiamide used, the greater its rate of dissolution. The establishment of a concentration of 10 weight % dicyandiamide nitrogen based on the total nitrogen content of the solution takes place rapidly and without problems at temperatures of about 20° C. Even upon the cooling of the solutions to values below the average temperature, no precipitation of dicyandiamide crystals takes place at a concentration of 10 weight % dicyandiamide nitrogen. Even at 0° C. no dicyandiamide crystallizes out upon storage from solutions of nitrogen-containing compounds containing 10 weight % dicyandiamide nitrogen. With phosphate- and potassium-containing solutions that also contain nitrogen compounds, which solutions cannot be prepared in such high concentrations as solutions having only nitrogen-containing compounds, we found it surprising that although dicyandiamide is the most difficultly soluble of the fertilizer components in the solution, potassium nitrate for example crystallizes out before the dicyandiamide.

It was surprising to us that the stability of the dicyandiamide introduced into the different fertilizer solutions remains unchanged. Even upon storage of the solutions for weeks at about 20° C., no change in the dicyandiamide concentration could be noted; no formation of dicyandiamide urea or other possible reaction products was observed.

The production of such fertilizer solutions containing dicyandiamide is effected in simple fashion by adding the calculated quantity of solid dicyandiamide to the solutions containing the nitrogen compounds and mixing for a short time.

The following Examples are intended to illustrate and explain the invention without, however, limiting it.

EXAMPLE 1

TABLE 1

Composition of the Fertilizer Solution in Weight %

| ammonium nitrate | urea | water | NH$_3$ | ammonium sulfate | ammonium phosphate | g of dicyandiamide dissolved in 100 g fertilizer solution | weight % dicyandiamide N referred to total N of the fertilizer solution |
|---|---|---|---|---|---|---|---|
| 39.5 | 30.5 | 30 | — | — | — | 6.8 | 16.2 |
| 69.1 | 7.7 | 23.2 | — | — | — | 6.0 | 14.4 |
| — | 16.0 | 50 | — | 34 | — | 6.0 | 26.6 |
| 14.5 | 11.5 | 50 | — | 24 | — | 7.7 | 32.4 |
| — | 37.5 | 58.2 | 4.3 | — | — | 7.2 | 22.8 |
| 33.3 | 6.1 | 45.5 | 15.1 | — | — | 13.3 | 32.6 |
| *— | — | 57 | — | 22 | 21 | 1.1 | 7.8 |

*Comparison Example

Table 1 clearly shows the high solubility of dicyandiamide in fertilizer solutions containing nitrogen compounds such as urea and ammonium nitrate and also shows that this effect is not obtained with ammonium sulfate. From the Table the difference in solubility of the dicyandiamide as a function of the nitrogen compounds in the solution can also be noted.

EXAMPLE 2

This Example illustrates the variations in the solubility of dicyandiamide at 20° C. in fertilizer solutions containing nitrogen compounds and phosphate.

In an aqueous solution containing a nitrogen compound and phosphate with equal portions of nitrogen- and phosphorus-pentoxide, ammonium sulfate is replaced by:

(a) ammonium nitrate+urea
(b) ammonium nitrate
(c) urea the total nitrogen content being maintained the same. The resulting dicyandiamide solutions are shown in Table 2.

As shown by the formulations, it is possible, by replacing ammonium sulfate by ammonium nitrate or urea or a mixture thereof, to increase the percentage of dissolved dicyandiamide to such an extent that at 20° C. the dicyandiamide nitrogen content of dicyandiamide-saturated solutions is far above 10% of the total nitrogen.

TABLE 2

Composition of the solution in weight %

| | ammonium sulfate | ammonium nitrate | urea | *diammonium-hydrogen phosphate (NH$_4$)$_{1.7}$H$_{1.3}$PO$_4$ | Solubility of dicyandiamide in g/100 g of solution | Weight % dicyandiamide N referred to total nitrogen |
|---|---|---|---|---|---|---|
| comparison | 31.2 | — | — | 18.9 | 1.1 | 6.9 |
| a | — | 9.9 | 7.4 | 18.9 | 3.8 | 24.0 |
| b | — | 19.8 | — | 18.9 | 3.6 | 22.8 |
| c | — | — | 14.8 | 18.9 | 4.4 | 28.0 |

*In order to prepare solutions containing a higher concentration of nitrogen and phosphorus, a mixture of mono- and diammonium phosphates in the ratio indicated is used. This mixture has a greater solubility in water than that of the pure salts.

EXAMPLE 3

Solubility of dicyandiamide in fertilizer solutions.

(a) Dicyandiamide is introduced to the saturation level at 20° C. into an aqueous solution containing nitrogen, phosphorus and potassium compounds and consisting of:

8.1 weight % ammonium nitrate
9.7 weight % urea
4.1 weight % potassium chloride
16.7 weight % (NH$_4$)$_{1.7}$H$_{1.3}$PO$_4$
61.4 weight % water.

The dicyandiamide dissolves in an amount of up to 4.6% by weight. Based on the total nitrogen content of the fertilizer solution, this is equal to 29 weight % nitrogen in the form of dicyandiamide.

In another portion of this solution containing nitrogen, phosphorus, and potassium compounds, 1.58 weight % dicyandiamide (=10% dicyandiamide nitrogen based on the total nitrogen) is dissolved. The solution is slowly cooled until crystallization occurs. At 0° C. the first crystals deposit. Upon the examination of these crystals it is found that they consist of precipitated potassium nitrate (formed from the reaction KCl+NH$_4$NO$_3$→KNO$_3$+NH$_4$Cl) and not dicyandiamide.

(b) 4.2 weight % dicyandiamide (=10 weight % dicyandiamide nitrogen based on the total nitrogen) is dissolved in a nitrogen fertilizer solution consisting of:

39.5% by weight ammonium nitrate
30.5% by weight urea
30% by weight water in which up to 6.8 weight % dicyandiamide would be capable of being dissolved at 20° C. The solution is slowly cooled to −10° C. No crystals precipitate.

(c) 2.5% by weight dicyandiamide (=10% by weight dicyandiamide nitrogen referred to total nitrogen) is dissolved in a nitrogen fertilizer solution consisting of:

24 weight % ammonium sulfate
14.5 weight % ammonium nitrate 11.5 weight % urea

The solution remains clear upon cooling to −5° C.

EXAMPLE 4

This Example illustrates the effect of dicyandiamide on the solubility of various trace nutrients in fertilizer solutions containing nitrogen compounds.

Various trace elements were dissolved up to saturated at 20° C. in each of two fertilizer solutions (A) and (B). Solution A contained 24% ammonium sulfate, 14.5% ammonium nitrate, 11.5% urea and 50% water. Solution B had the same composition as solution A except that it also contained 2.4% dicyandiamide, which corresponds to 10% dicyandiamide nitrogen based on the total nitrogen in the solution. The results of these solubility tests are summarized in Table 3 below.

TABLE 3

| | Solution A | Solution B |
|---|---|---|
| Borax × 10 $H_2O$ | 6% | 8% |
| Cupric sulfate × 5 $H_2O$ | 0.3% | 4% |
| Ammonium molybdate × 4 $H_2O$ | 1% | 2% |
| Zinc sulfate × 7 $H_2O$ | 0.18% | 0.5% |
| Cobalt nitrate × 6 $H_2O$ | 1% | 4.8% |
| Nickel nitrate × 6 $H_2O$ | 0.32% | 1.15% |

It is evident from the foregoing data that dicyandiamide is capable of substantially increasing the solubility of the micronutrient salts.

EXAMPLE 5

This Example illustrates the improved stability of trace nutrients in fertilizer solutions containing dicyandiamide.

(a) 0.1% of ferric sulfate × $5H_2O$ is dissolved in each of the fertilizer solutions A and B as in Example 1. After storage for one week the dicyandiamide-containing solution is still entirely clear. The solution without dicyandiamide shows deposits of ferric hydroxide at the bottom.

(b) 0.5% manganese sulfate × $H_2O$ is dissolved in each of solutions A and B of Example 1. After storage for four weeks the dicyandiamide-containing solution is still completely clear, while the solution without dicyandiamide has a precipitate of dark-brown manganese dioxide after only a few days.

EXAMPLE 6

This Example illustrates the stability of a fertilizer solution having a base of commercial nitrogen fertilizers and containing dicyandiamide and numerous trace elements.

4.2% dicyandiamide, which is equivalent to 10% dicyandiamide nitrogen based on total nitrogen, is dissolved in a fertilizer solution consisting of:

39.5% ammonium nitrate
30.5% urea
30.0% water and 0.1% of each of the following trace elements is dissolved therein:

boric acid
manganese chloride × $4H_2O$
ammonium molybdate × $4H_2O$
cobalt nitrate × $6H_2O$
nickel nitrate × $6H_2O$
cupric nitrate × $5H_2O$
zinc chloride.

The resultant solution remains clear for weeks without forming a deposit.

EXAMPLE 7

This Example illustrates a stable nitrogen fertilizer solution containing a potassium compound, dicyandiamide, and trace elements.

2.25% dicyandiamide, equivalent to 10% dicyandiamide nitrogen based on total nitrogen, is dissolved in a fertilizer solution consisting of:

32% urea
15.8% potassium chloride
48.2% water 0.1% of each of the following micronutrients was added thereto:

boric acid
manganese chloride × $4H_2O$
ammonium molybdate × $4H_2O$
cobalt nitrate × $6H_2O$
nickel nitrate × $6H_2O$
cupric sulfate × $5H_2O$
zinc chloride A clear solution is obtained which remains stable for weeks.

In another solution of the same composition the following micronutrients were dissolved in a quantity of 0.1% each:

boric acid
manganese chloride × $4H_2O$
magnesium chloride × $6H_2O$
zinc sulfate × $7H_2O$
ammonium molybdate × $4H_2O$ Again a clear solution is obtained that remains stable for weeks.

EXAMPLE 8

This Example illustrates a stable nitrogen/phosphorus/potash (NPP) fertilizer solution that additionally contains micronutrients.

1.58% dicyandiamide, equivalent to 10% dicyandiamide nitrogen based on total nitrogen, is dissolved in an aqueous fertilizer solution consisting of the following compounds containing nitrogen, phosphorus, and potassium:

8.1% ammonium nitrate
9.7% urea
4.1% potassium chloride
16.7% diammonium hydrogen phosphate $(NH_4)_{1.7}H_{1.3}PO_4)$
64.4% water The following quantities of micronutrients are added thereto:

0.5% borax
0.1% ammonium molybdate
0.1% potassium chromate
0.1% potassium bromide
0.1% potassium iodide A stable, clear fertilizer solution is obtained.

We claim:

1. A fertilizer composition which is an aqueous solution of a nitrogen-containing compound selected from urea, ammonium nitrate, ammonia and mixtures thereof and dicyandiamide in an amount such that the dicyandiamide nitrogen is 10% or more by weight of the total nitrogen of said solution.

2. A composition according to claim 1 wherein said aqueous solution has dissolved therein in addition to said nitrogen-containing compound and said dicyandiamide, a compound selected from ammonium sulfate, water-soluble phosphates and water-soluble potassium salts.

3. A fertilizer composition according to claim 1 wherein said nitrogen-containing compound is urea.

4. A fertilizer composition according to claim 1 wherein said nitrogen-containing compound is ammonium nitrate.

5. A method of making the fertilizer solution of claim 1 which comprises preparing an aqueous solution of said nitrogen-containing compound and thereafter dissolving crystalline dicyandiamide therein.

6. A fertilizer composition consisting essentially of an aqueous solution of at least one commonly used nitrogen-containing fertilizer compound selected from urea, ammonium nitrate, ammonium sulfate and ammonia, said solution having micronutrients dissolved therein and containing a stabilizing amount of dicyandiamide to maintain said micronutrients in solution.

7. A fertilizer composition according to claim 6 wherein said solution has a phosphorus-containing fertilizer compound dissolved therein.

8. A fertilizer composition according to claim 6 wherein said solution has a potassium-containing fertilizer compound dissolved therein.

9. A fertilizer composition according to claim 6 wherein the dicyandiamide nitrogen in said solution is at least about 10% by weight of the total nitrogen in said solution.

10. A fertilizer composition according to claim 6 wherein the dicyandiamide nitrogen in said solution is from about 10% to about 35% by weight of the total nitrogen in said solution.

11. A fertilizer composition according to claim 6 wherein said micronutrients are metal salts.

12. A fertilizer composition according to claim 6 wherein said micronutrients comprise from about 0.1 to about 1.5% by weight of said solution.

13. In an aqueous micronutrient-containing nitrogenous fertilizer solution containing at least one fertilizer compound selected from urea, ammonium nitrate, ammonium sulfate and ammonia, the improvement which comprises a stabilizing amount of dicyandiamide in said solution to prevent precipitation of said micronutrients.

14. A fertilizer solution according to claim 13 wherein the dicyandiamide nitrogen is at least about 10% by weight of the total nitrogen of the solution.

* * * * *